Figure 12:
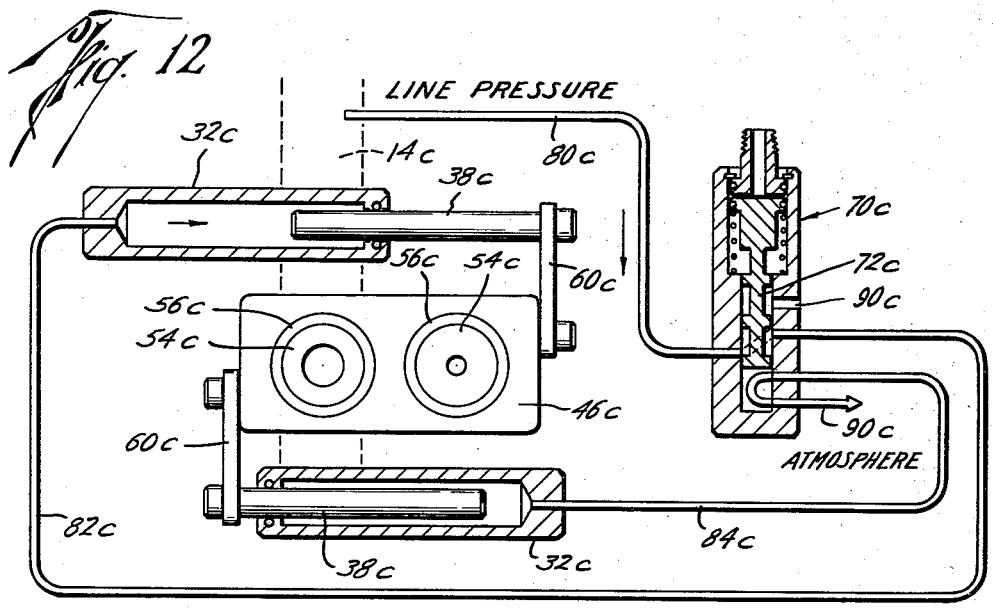

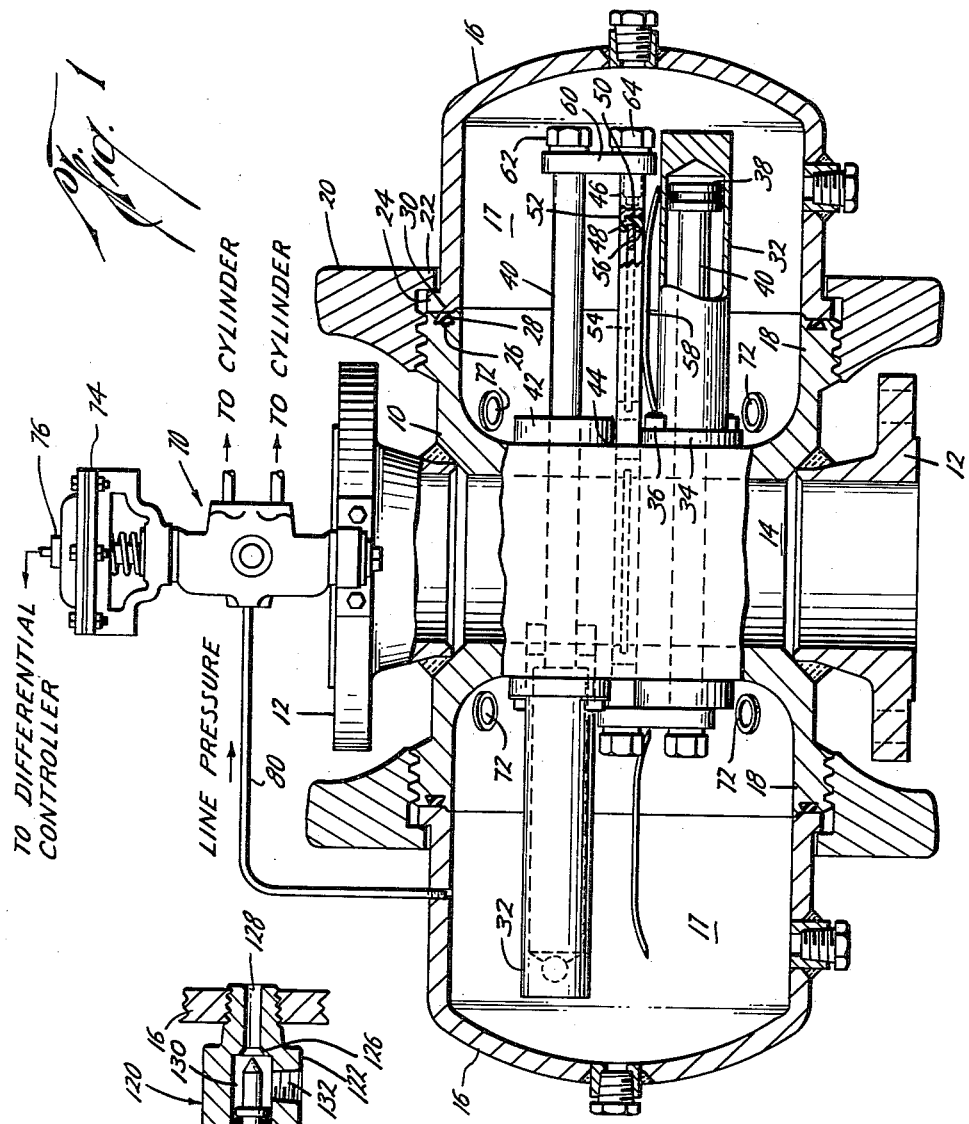

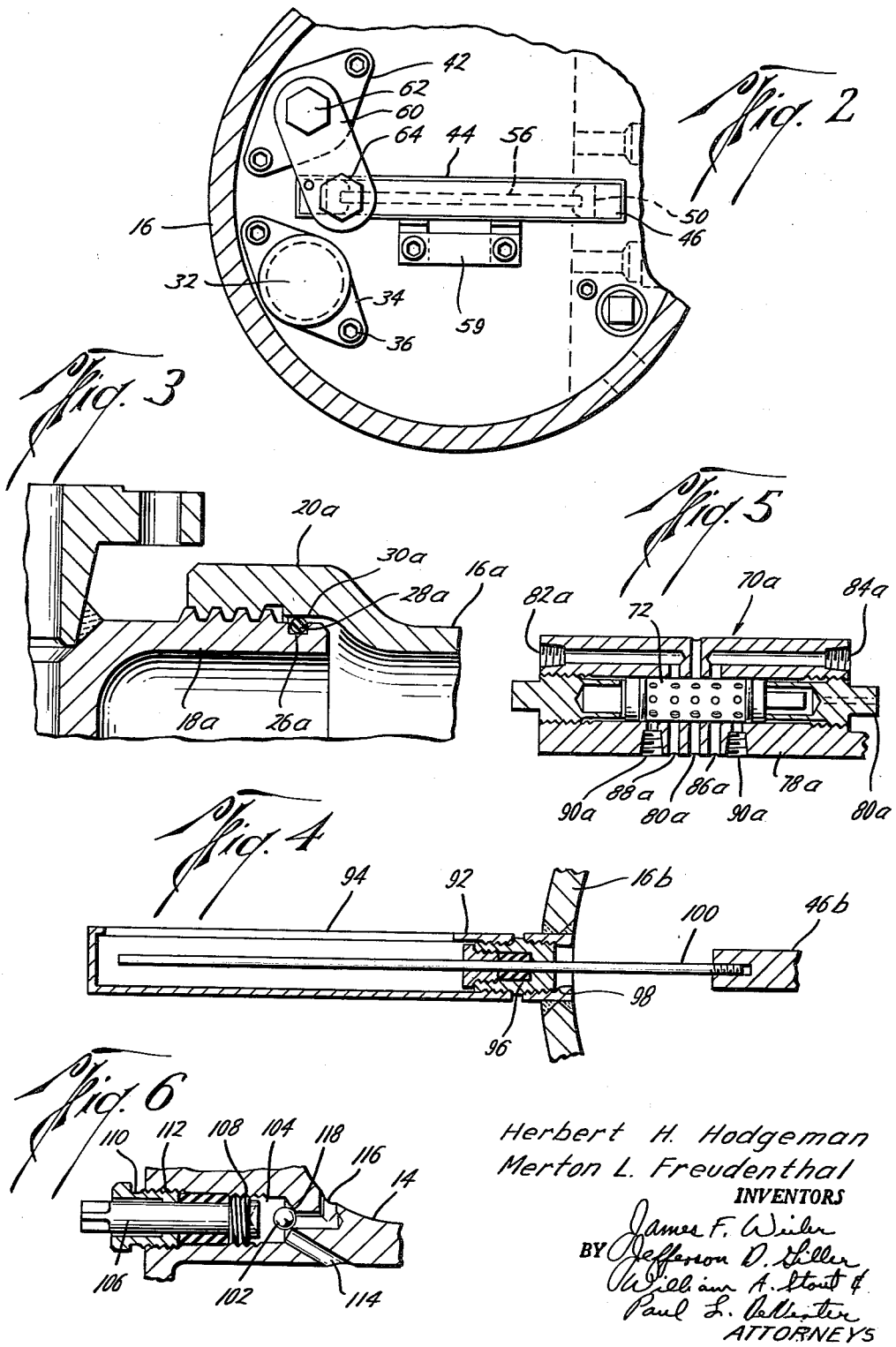

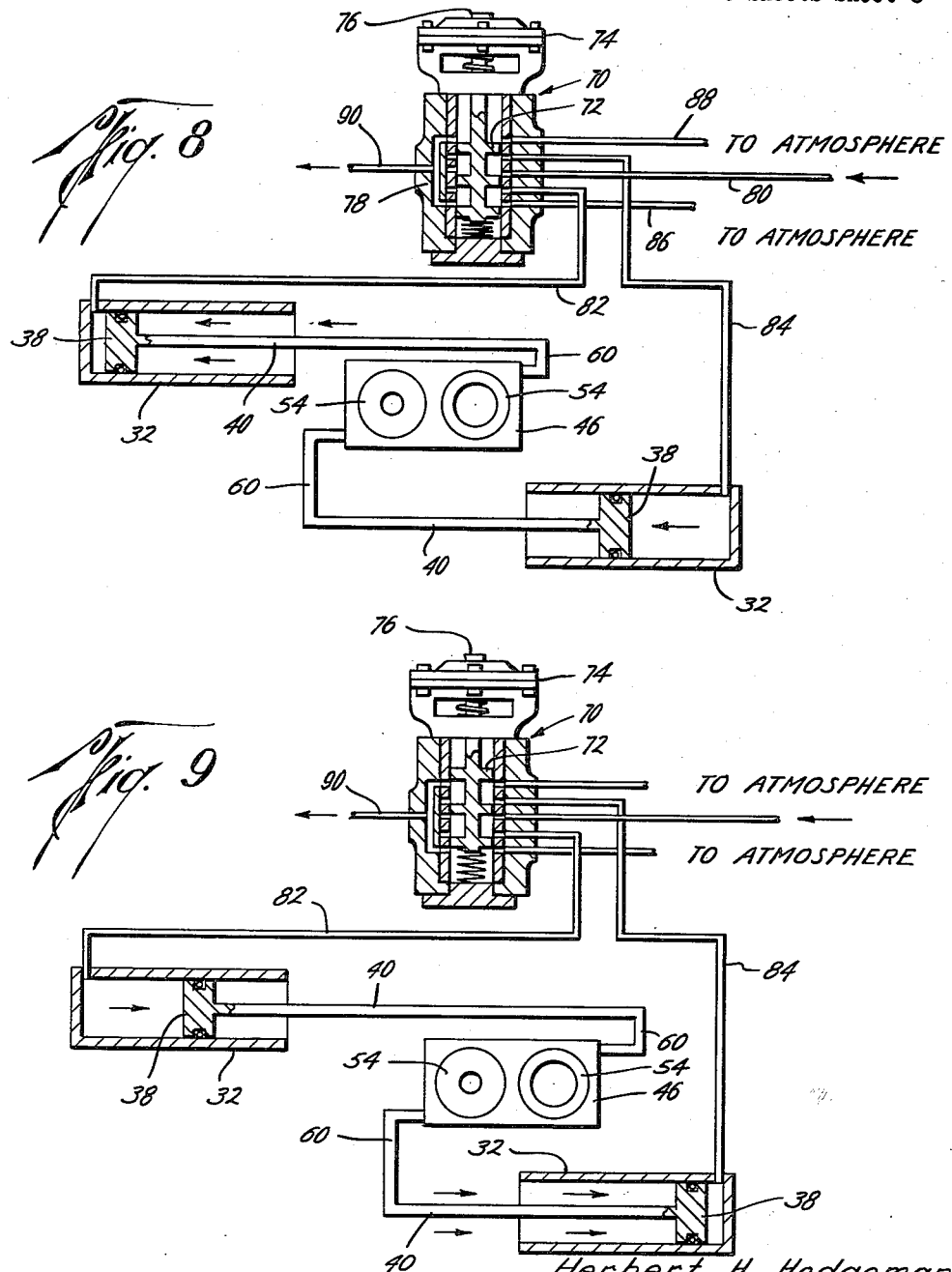

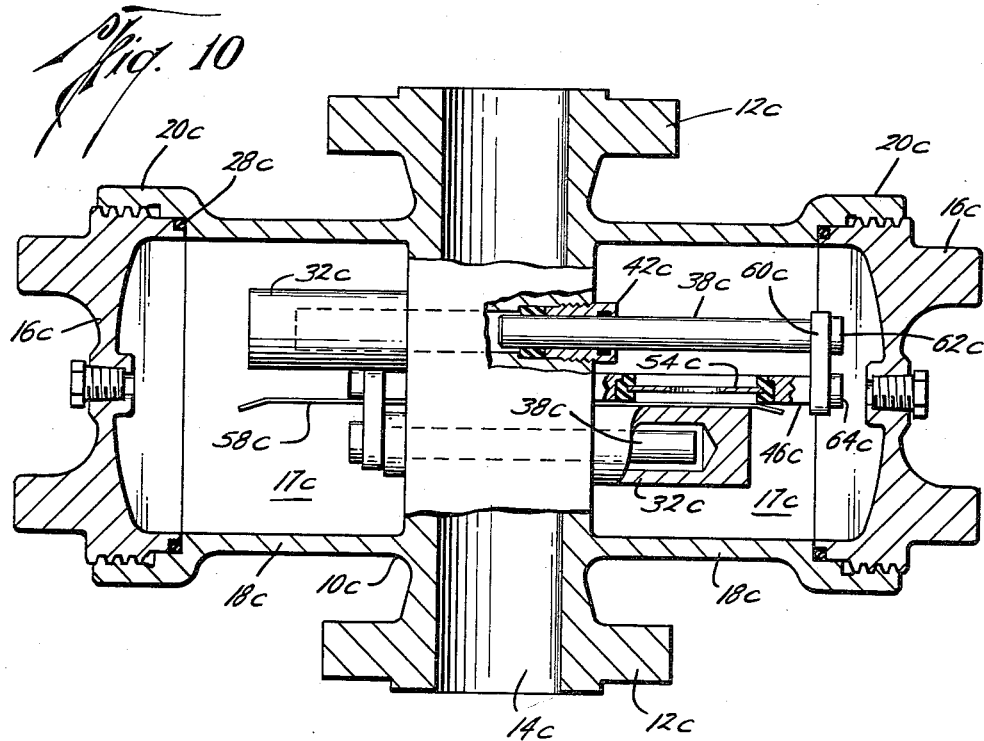
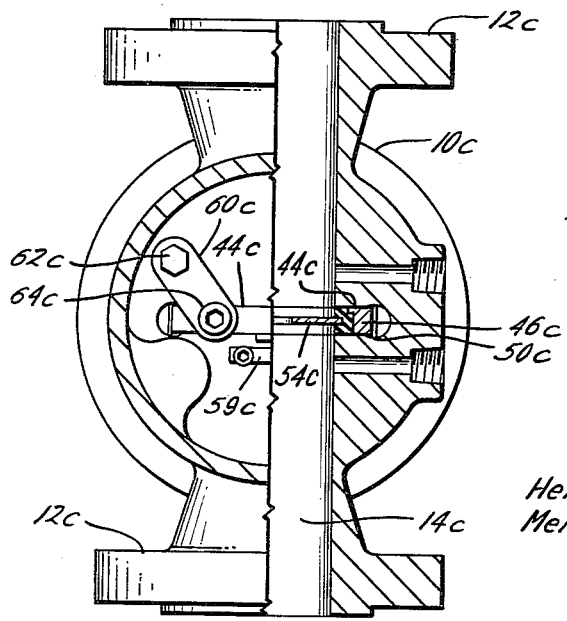

United States Patent Office 3,105,384
Patented Oct. 1, 1963

3,105,384
ORIFICE TRANSFER FITTING
Herbert H. Hodgeman, Houston, Tex., and Merton L. Freudenthal, Gretna, La., assignors to Daniel Orifice Fitting Company, Houston, Tex., a corporation of California
Filed Jan. 23, 1961, Ser. No. 84,224
9 Claims. (Cl. 73—211)

This invention relates to flow measuring apparatus wherein pressures are measured upstream and downstream from an orifice plate assembly to determine the rate of flow of fluid. The present invention is particularly directed to an improved orifice plate transfer fitting by which one of a pair of orifice plate assemblies are brought into flow measuring position in a flow line.

In measuring flow of fluid in flow lines considerable difficulty has been encountered in making accurate measurements due to the drop and increase in line flow. For example, in gas lines during the daytime the line flow is relatively high and at night the line flow drops considerably and is relatively low. Under these circumstances a constant-sized orifice does not give as accurate results as desired and introduces an error into the measurement of flow in the gas line. Previously, in many installations, to overcome this problem, two orifice fittings, two meter tubes and dual instrumentation has been required to measure the flow.

It would be highly desirable to provide an orifice transfer device which either automatically or manually brings an orifice plate of the desired size into flow measuring position in a flow line for a particular line flow or range of line flows so that only one orifice fitting, one meter tube and one set of instruments are necessary thereby effectuating savings in material and installation costs as well as savings in space, such as in offshore and other installations where space is at a premium. The present invention is directed to such an orifice transfer fitting.

It is therefore an object of the present invention to provide an improved orifice plate transfer mechanism or fitting by which an orifice plate of optimum size for a particular line flow or range of line flows is brought into flow measuring position in the flow line.

A further object of the present invention is the provision of such an orifice transfer mechanism or fitting that is operable either manually or automatically and which is comparatively simple, but strong, durable, compact and highly efficient and reliable in operation and which may be manufactured, maintained and operated at low cost.

Yet a further object of the present invention is the provision of such an orifice plate transfer assembly or fitting in which quick, easy and ready means of access to the various working parts in the fitting can be made for inspection, repair or change of orifice plates when necessary or desirable.

Yet a further object of the present invention is the provision of such an improved orifice plate transfer assembly or fitting which is a self contained unit with all working parts within a sealed chamber thereby avoiding any hazardous leaks and avoiding moving parts going through the pressure chamber thereby eliminating the necessity of stuffing boxes and the like and thereby assuring a friction free operation which is particularly advantageous when the fitting is used at high operating pressures.

Still a further object of the present invention is the provision of such an improved automatic orifice plate transfer mechanism or fitting in which the control valve advantageously can be installed either outside or within the working chamber as an integral part of the mechanism and in which the control valve is controlled by the differential pressure across the orifice plate by incorporating a high-low differential controller.

Yet a further object of the present invention is the provision of such an improved orifice plate transfer assembly or fitting in which the closure members of the pressure chamber may be removed for inspection or replacement of orifice plates without the necessity of bleeding down the flow line.

Yet a further object of the present invention is the provision of such an improved orifice plate transfer device or fitting in which the orifice plate is centered by positive stops eliminating the possibility of having the fitting put into operation with the orifice plate out of position and which includes visual indicating means showing the location of the orifice plate carrier.

It is yet a further object of the present invention to provide an orifice plate transfer device or fitting by which varying flow in a line may accurately be measured by a single orifice fitting, a single meter tube and a single set of instruments and which is compact in size.

Yet a further object of this invention is the provision of an orifice transfer device or fitting which is fully automated by use of a differential limit controller, which can be remote controlled for offshore and inaccessible areas and operated with telemetering facilities, which can be operated by a programmer when used, for example, with automatic well tests, which can be used to measure peak and minimum gas fuel flows, for example, in boiler automation, and which generally extends the range of orifice metering.

Still a further object of the present invention is the provision of such an improved orifice plate transfer assembly or fitting which lends itself to construction from stock material if desired, lends itself to easy assembly, decreased machine time, and which may be mass produced.

Yet a further object of the present invention is the provision of such an improved orifice plate transfer device or fitting which may conveniently be operated from a remote location and which can readily be incorporated into and be operated by automation systems.

Other and further objects, features and advantages will appear from the following description of presently-preferred embodiments of the invention, given for the purpose of disclosure and taken in conjunction with the accompanying drawings, where like references designate like parts throughout the several views, and where—

Figure 13:
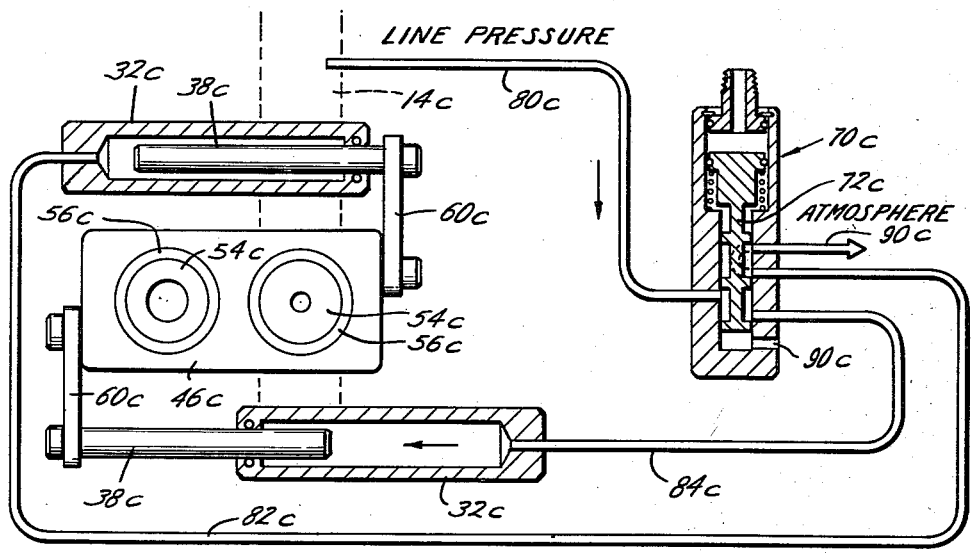

FIGURE 1 is a front elevation, partly in section, illustrating an orifice transfer plate fitting according to the invention, FIGURE 2 is a fragmentary end view, partly in section of the right hand end of FIGURE 1, FIGURE 3 is an enlarged fragmentary view illustrating a modified connection of the end cap to the body, FIGURE 4 is an enlarged fragmentary view illustrating means for indicating the position of the orifice plate, FIGURE 5 is a fragmentary enlarged view of a modified form of control valve, FIGURE 6 illustrates an equalizing valve for the chambers, FIGURE 7 is a fragmentary view illustrating a needle valve for bleeding pressure from the chambers, FIGURE 8 is a flow diagram illustrating flow of pressure fluid for actuating the orifice plate carrier in one direction, FIGURE 9 is a flow diagram similar to FIGURE 8 illustrating flow of pressure fluid in the other direction for reversing the movement of the orifice plate carrier, FIGURE 10 is a view similar to FIGURE 1 illustrating a modified orifice transfer plate fitting according to the invention, FIGURE 11 is an end view, partly in section, of the fitting of FIGURE 10, FIGURE 12 is a flow diagram illustrating a modified means according to the invention in position for actuating the orifice plate carrier in one direction, and FIGURE 13 is a flow diagram of the modified means of FIGURE 12 in position for actuating the orifice plate carrier in the other direction.

Referring now to the drawings, and particularly to FIGURE 1, one form of the orifice plate transfer mechanism or fitting of the present invention generally includes the cylindrical or generally tubularly-shaped body 10 which is welded or otherwise rigidly secured to the inner ends of the neck flanges 12 by which the fitting is secured to adjacent ends of a flow line, not shown, such as by bolts and the like. Thus, the generally cylindrical passage 14 through the body 10 and neck flanges 12 constitutes a continuation of the internal passage of the flow line, not shown, to which the fitting is connected.

A pair of end closure members 16 are provided, one each of which is removably secured to the generally cylindrically and outwardly projecting flanges 18 of the body 10, such as by the threaded wing nut 20 provided with the inwardly extending annular projection 22 and bearing against the upset annular shoulder 24.

Sealing grooves 26 are provided in the ends of the flanges 18 into which are positioned the sealing rings 28 which bear against the inner faces 30 of the flanges 24 of the closures 16 to provide a seal. This is particularly advantageous in that all of the moving parts of the orifice plate transfer mechanisms are completely housed within what might be termed sealed pressure chambers thereby avoiding parts moving through these chambers and any stuffing boxes or seals in connection therewith thus effectively avoiding hazardous leaks and the like.

Any desired sealing arrangement, of course, may be utilized in connection with providing a seal between the end closures 16 and body members 18. Similarly, any desired means may be utilized to releasably secure the end closures 16 to the circumferentially-extending flanges 18 of the body 10. For example, referring now to FIGURE 3 such a modification is illustrated in which the reference letter "a" has been added to parts similar to those of FIGURE 1. Here, the inner ends 26a of the closure members 16a are internally enlarged and threaded directly to the threaded circumferentially-extending flanges 18a with a corresponding change in the sealing grooves 26a, seal rings 28a and sealing surfaces 30a of the closure members 16a.

Thus, any desired releasable securing means and sealing arrangement may be utilized. Preferably, however, a quick make-up and release arrangement should be utilized so that the end closures 16 and 16a may quickly and readily be removed and replaced for making repairs, replacements, servicing and the like.

Disposed in each pressure chamber 17 formed by the end or cap like closures 16 and annular flanges 18 is a cylinder 32 secured adjacent the inner end of the annular flange 18 by the retainer plate 34 and bolts 36. Disposed within each cylinder 32 is the piston 38 to which is connected the piston rod 40 which extends through the body 10 and exteriorly of the passage 14 into the opposite chamber 17.

Each piston rod 40 passes through the bushing 42 in the opposite chamber 17, which bushing 42 is secured to the body 10 by the bolts 44, as best seen in FIGURE 2.

Still with reference to FIGURE 2, the body 10 is provided with a slot 44 which extends across the flow passage 14 at right angles to its axis and opens into each chamber 17. Slidably disposed for sliding movement in the slot 44 is an orifice plate carrier 46 which is of a size to contain a pair of orifice plate assemblies 48 in a generally cylindrical opening 50 provided with an inwardly-extending annular flange 52 at one side.

As illustrated, the orifice plate 54 is secured within the sealing ring 56 and positioned in the cylindrical opening 15 and is there held in place by the springs 58 held in place by the spring clips 59, which springs 58 bear against the other side of the orifice plate assembly 48 when not in position in the passage 14 but in the chamber 17.

In order that the cylinders 32, pistons 38 and piston rods 40 reciprocate the plate carrier 46, a connecting plate-like member 60 is connected to each outer end of the piston rod 40 and to opposite ends of the plate carrier 46, such as by the bolts 62 and 64. Thus, actuation of the pistons 38 causes movement of the piston rods 40 and a corresponding movement of the plate carrier 46.

In order to simplify the disclosure, and particularly FIGURE 1, the various lines extending from the four-way pilot valve 70 are not shown secured to opposite ends of the cylinders 32. It is understood, of course, that pneumatic flow lines will be so provided connecting the four-way pilot valve 70 through the ports 72 in each of the body portions 10 and connected to opposite ends of the cylinders 32. The pneumatic system, however, is illustrated in FIGURES 8 and 9, reference now being made to FIGURE 8.

As illustrated in FIGURE 8, the four-way pilot valve 70 is of a conventional type, readily available on the market, and includes the valve 72 actuated by the diaphragm, not shown, but within the diaphragm housing 74 in response to pressure entering line 76 from a differential controller, not shown. The arrangement is conventional and is such that the diaphragm actuates the valve 72 in response to a predetermined minimum pressure and a predetermined maximum pressure.

Line pressure is provided into the valve body 78 by means of the line 80, which is secured to the flow line, not shown, in which flow is desired to be measured. Depending upon the position of valve 72 the line pressure is directed into either of the lines 82 and 84 connected to the outer end of each cylinder 32.

Also connected through the valve body 78 and controlled by the valve 72 are the exhaust lines 86 and 88 which are connected to the ends of the cylinders 32 opposite from the power lines 82 and 84. The exhaust lines 86 and 88 communicate with the exhaust port 90 in the valve body 78 depending upon the position of the valve 72.

No more description of the structural details of the pneumatic system is set forth inasmuch as the system for actuating the pistons 38 is conventional, the various components may be purchased upon the open market, the only requirement being that the differential pressure valve and system be responsive to a predetermined minimum and a predetermined maximum pressure differential for actuation of the pistons 38 to bring the desired orifice plate 54 into position in the line.

Referring to FIGURE 9, this view is the same as that of FIGURE 8 but illustrates the four-way pilot valve 70 and its valve 72 in a position for reversing the flow of pressure fluid and thus reversing the movement of the pistons 38 and therefore the piston rods 40 which in turn move the plate carrier 46 for bringing the desired orifice plate 54 into flow measuring position in the passage 14 of the flow line, not shown.

As previously mentioned, any desired type of valve or pressure control arrangement may be utilized and, if desired, this may be positioned within one of the chambers 17. Such a valve is illustrated in FIGURE 5, to which the reference letter "a" is given to parts corresponding to those of FIGURES 8 and 9. The valve here shown is a four-way pneumatic lapped spool valve which is a commercial item sold under the trademark "Pneumatic SA Series Valve." As illustrated, the various power and exhaust lines are connected to the valve body 78a, as indicated, the same as in connection with the differential control valve 70 of FIGURE 8. Since any desired arrangement may be utilized to provide the pressure to reciprocate the pistons 38, no detailed description of the structure of the valve of FIGURE 5 is deemed necessary.

The particular details and arrangement of parts of the orifice transfer fitting of the present invention may vary considerably. For example, a satisfactory modified orifice transfer fitting is illustrated in FIGURES 10 and 11, to which reference is now made. In these figures the reference character "c" is added to those numerals designating corresponding parts in the preceding views.

The orifice transfer fitting illustrated in FIGURES 10 and 11 is the same as that of the preceding figures except that the body 10c is generally made from a single casting, the end closure members 16c are changed in form as shown, and the pistons 38 and piston rods 40 have been combined in the rams 38c to provide a simplification in the pneumatic system for moving the orifice plate carrier 44c in that the return lines 86 and 88, as shown in FIGURES 8 and 9, have been eliminated.

A satisfactory pneumatic system for actuating the rams 38c is shown in FIGURES 12 and 13, to which reference is now made, and in which the letter "c" has been added to parts corresponding to those as shown in FIGURES 8 and 9.

The pneumatic system illustrated in FIGURES 12 and 13 is the same as that of FIGURES 8 and 9 except that movement of the valve 72c either permits line pressure from line 80c to be introduced into or exhausted to atmosphere in the same line, lines 82c and 84c, from the respective cylinders 32c to which they are connected. This results in an unbalancing of the rams 38c in a particular direction which, of course, results in their movement and thus movement of the plate carrier 46c.

The other and remaining parts, as well as their operation, are the same as previously described and no more description thereof is deemed necessary or given.

Thus, the orifice transfer fitting may take many forms and any suitable means may be provided for actuating the pistons 38 or rams 38c, such as in response to minimum and maximum pressure differentials existing in the flow line, or in response to remote control operations, automatic timers and the like.

In many instances it is desirable to have a visual indication as to which orifice plate is in the line. Such a visual indicator is illustrated in FIGURE 4, to which reference is now made and in which the reference letter "b" has been added to parts corresponding to those of the other figures for convenience of reference.

As illustrated in FIGURE 4 the indicator includes the body 92 provided with the opening or slot 94 extending along one side, which body 92 is threadedly secured in the stuffing box type fitting 96 which, in turn, is threaded in the threaded opening 98 in end cap 16b. A pointer 100, in the form of a rod, is secured to one end of the plate carrier 46b, such as by threading or other suitable means, and extends through the stuffing box fitting 96 into the indicator body 94.

By the arrangement illustrated in FIGURE 4, the position of the pointer 100 within the body 92 is viewed through the opening 94 which indicates the position of the plate carrier 46b thereby indicating which orifice plate is in flow measuring position in the passage 14 of the flow line, not shown.

For most efficient operation, the pressures within the chamber 17 are equalized with the pressure within the flow passage 14 of the body 10. A suitable equalizing valve is illustrated in FIGURE 6, to which reference is now made, which includes a ball type valve element 102 disposed within the valve chamber 104 which includes the plunger 106 threaded within the threaded opening 108 of the valve chamber 104. The plunger 106 extends through the stuffing box type fitting 110, the latter being threaded in the threaded opening 112 constituting the outer portion of the valve chamber 104.

The valve chamber 104 is in fluid communication with the passage 14 in the body and also has a passage 114 extending into both of the chambers 17.

With the equalizing valve in the position illustrated in FIGURE 6, line pressure from the passage 14 flows in the passage 116 into the valve chamber 104 and through the passage 114 into each of the chambers 17 thereby equalizing the pressure within the chambers 17 with the line pressure within the passage 14. In the event it is desired to cut off the line pressure from the chambers 17, for example when removing the end caps 16, the valve stem or plunger 106 is rotated to force the valve ball element 102 up against the valve seat 118 thereby cutting off the pressure from the passage 14 through the port 116. Once one or more of the end caps 16 have been removed and replaced, simply rotating the valve stem 106 permits the pressure to be again equalized in the chamber 17.

Before removing an end cap 16 from a chamber 17, however, it is necessary to bleed off the pressure within that chamber 17. For this purpose a bleed valve 120 is provided which includes the valve body 122 in the form of a fitting threaded into the end cap 16, in which valve body 122 there is provided a needle valve 124 which seats upon the valve seat 126.

Thus, by opening the needle valve 124 pressure is permitted to bleed from the chamber 17 through the passage 128 into the valve chamber 130 and out the passage 132. At this time, one or more of the end caps 16 may be removed. Once the end caps 16 have been replaced, the needle valve 124 is again closed so that pressure within the chamber 17 is confined again to provide chambers of equalized pressure with the pressure in the flow line upon opening the equalizing valve.

The equalizing valve and bleed valves described are advantageous in that while the chambers 17 are maintained at the pressure within the flow line and provide balanced conditions for the operation of the orifice transfer apparatus, the caps 16 may be removed and repairs and replacements made without shutting down the line by simply closing the equalizing valve and bleeding off the pressure in either or both of the chambers 17 as required. The pressure in chambers 17 is again equalized with the line pressure after the end caps 16 have been reassembled, the bleed valves closed and the equalizing valve opened.

In use, the orifice transfer fitting is connected in a flow line as previously described. Depending upon the pressure in the line, the differential pressure controller 70 or 70c causes the pressure to be applied to the pistons 38 or rams 38c and the cylinders 32 or 32c, as previously described, which thereby cause a movement of the plate carrier 46 or 46c and, hence, the desired orifice 54 into position in the passage 14 or 14c forming a continuation of the flow line. Thus, an appropriately-sized orifice is automatically brought into flow measuring position in the flow line depending upon the line pressure.

As previously mentioned, any desired means may be utilized for moving the plate carrier, either automatic or manual, such as the differential pressure controllers described or others as well as automatic timers and the like.

Repairs and replacements of parts are readily and easily made without having to shut down the flow line, all as previously mentioned.

The present invention, therefore, is well suited and adapted to attain the objects and ends and has the advantages and features mentioned as well as others inherent therein.

While presently preferred embodiments of the invention have been given for the purpose of disclosure, changes in the parts and the arrangement of parts may be made which are within the spirit of the invention as defined by the scope of the appended claims.

What is claimed is:

1. A multiple orifice fitting comprising, a body provided with a flow passage and adapted for connection to a flow line so that the flow passage constitutes a portion of the flow line, said body provided with a pair of chambers disposed generally on opposite sides of the flow passage and a slot extending across and at right angles to the axis of the flow passage, said slot communicating with each of said chambers, an orifice plate carrier arranged to carry a plurality of orifice plates movably disposed in the slot and movable in each of said chambers, a piston and cylinder assembly in each chamber, a piston rod extending from each piston into the opposite chamber, means connecting opposite portions of the plate carrier to one each of the piston rods, and means for applying pressure into each of the cylinders for reciprocating the pistons therein and thereby moving the plate carrier and one of the orifice plates out of and another of the orifice plates into flow measuring position in the flow passage.

2. An orifice transfer fitting comprising, a body provided with a flow passage and adapted for connection to a flow line so that the flow passage constitutes a portion of the flow line, said body provided with a pair of chambers generally disposed on opposite sides of the flow passage and a slot extending across and at right angles to the axis of the flow passage, said slot communicating with each of said chambers, an orifice plate carrier arranged to carry a pair of orifice plates reciprocally disposed in the slot and reciprocal into each of the chambers, a piston and cylinder assembly in each chamber, a piston rod extending from each piston into the opposite one of each of said chambers, means connecting opposite portions of the plate carrier to each of the piston rods, and means for providing pressure fluid to the cylinders for moving the pistons and therefore the plate carrier, said means including a pressure differential controller responsive to predetermined minimum and predetermined maximum pressure differentials in the flow line.

3. The orifice transfer fitting of claim 2 including end caps releasably closing the ends of each of said chambers, valved pressure equalizing passage means establishing and cutting off pressure communication from the flow passage to each of the chambers, and additional valve passage means in each of the chambers communicating exteriorly thereof for bleeding off pressure in each of the chambers.

4. The orifice transfer fitting of claim 2 including means disposed externally of the body and operatively connected with the plate carrier indicating the position of the plate carrier.

5. An orifice transfer fitting comprising, a body provided with a flow passage and adapted for connection to a flow line so that the flow passage constitutes a portion of the flow line, said body provided with a pair of chambers disposed generally on opposite sides of the flow passage and a slot extending across and at right angles to the axis of the flow passage, said slot communicating with each of said chambers, an orifice plate carrier arranged to carry a plurality of orifice plates movable disposed in the slot and movable in each of the chambers, a ram and cylinder assembly in each chamber, an end of the ram extending from each cylinder into the opposite one of each of the chambers, means connecting opposite portions of the plate carrier to and adjacent the ends of the rams, and means for applying and venting pressure into and from each of the cylinders for reciprocating the rams therein and thereby moving the plate carrier and one of the orifice plates out of and another of the orifice plates into flow measuring position in the flow passage.

6. An orifice transfer fitting comprising, a body provided with a flow passage and adapted for connection to a flow line so that the flow passage constitutes a portion of the flow line, said body provided with a pair of chambers generally disposed on opposite sides of the flow passage and a slot extending across and at right angles to the axis of the flow passage, said slot communicating with each of said chambers, an orifice plate carrier arranged to carry a pair of orifice plates reciprocally disposed in the slot and reciprocal into each of the chambers, a ram and cylinder assembly in each chamber, an end of the ram extending from each piston into the opposite one of each of said chambers, means connecting opposite portions of the plate carrier to the ends of the rams, and means for applying and venting pressure fluid into and from the cylinders for moving the rams and therefore the plate carrier, said means including valve means responsive to predetermined minimum and predetermined maximum pressure differentials in the flow line.

7. A multiple orifice fitting comprising, a body provided with a flow passage and adapted for connection to a flow line so that the flow passage constitutes a portion of the flow line, said body provided with a pair of chambers disposed generally on opposite sides of the flow passage and a slot extending across and at right angles to the axis of the flow passage, said slot communicating with each of said chambers, an orifice plate carrier arranged to carry a plurality of orifice plates movably disposed in the slot and movable into each of the pair of chambers, an annular seal about each of said orifice plates adapted to seal said flow passage from the pair of chambers when the orifice plate is moved into flow measuring position in the flow passage, a pressure equalizing valve means removed from said slot and having a pressure equalizing passageway communicating from the flow line into each of said chambers for permitting and cutting off pressure flow from the flow line into each of the chambers, a bleed off valve in each of said chambers communicating the interior of the chamber with its exterior for bleeding off pressure within each chamber, and means operatively connected to the plate carrier for moving the plate carrier and one of the orifice plates out of and another of the orifice plates into fluid measuring position in the flow passage.

8. The invention of claim 7 wherein the plate carrier moving means includes a cylinder in each chamber and fluid actuated means in each cylinder connecting opposite portions of the plate carrier, and means for applying and venting pressure into and from each of the cylinders for reciprocating the fluid actuated means and thereby moving the plate carrier and one of the orifice plates out of and another of the orifice plates into flow measuring position in the flow passage.

9. The invention of claim 8 including a pressure differential controller means responsive to predetermined minimum and predetermined maximum pressure differentials in the flow line which is connected to said cylinders for moving the plate carrier in response to a predetermined maximum and predetermined minimum pressure differentials in the flow line.

References Cited in the file of this patent

UNITED STATES PATENTS

| | | |
|---|---|---|
| 1,921,298 | Lewis | Aug. 8, 1933 |
| 2,035,472 | Hammond | Mar. 31, 1936 |
| 2,433,973 | Anderson | Jan. 6, 1948 |